United States Patent [19]

Ganske et al.

[11] Patent Number: 5,252,373
[45] Date of Patent: Oct. 12, 1993

[54] SHOCK ABSORBING PAD

[75] Inventors: Jary M. Ganske, Waco; Leon Ganske, Crawford, both of Tex.

[73] Assignee: WRS Group, Inc., Waco, Tex.

[21] Appl. No.: 850,250

[22] Filed: Mar. 11, 1992

Related U.S. Application Data

[63] Continuation of Ser. No. 673,647, Mar. 22, 1991, abandoned.

[51] Int. Cl.5 .............................................. B32B 1/04
[52] U.S. Cl. ...................................... 428/68; 297/214;
297/DIG. 1; 297/DIG. 2; 428/71; 428/76;
428/319.3; 428/319.7; 428/320.2
[58] Field of Search ............... 428/68, 76, 71, 320.2,
428/319.7, 319.3; 297/214, DIG. 1, DIG. 2;
5/449, 451, 481, 431, 450; 2/411, 413; 128/98.1

[56] References Cited

U.S. PATENT DOCUMENTS

| 3,077,363 | 2/1963 | Mesinger | 297/214 |
| 3,997,214 | 12/1976 | Jacobs | 297/214 |
| 4,098,629 | 7/1978 | Goldstone | 264/134 |
| 4,242,072 | 12/1980 | Enicks | 264/321 |
| 4,429,915 | 2/1984 | Flager | 297/214 |
| 4,456,642 | 6/1984 | Burgdorfer | 428/76 |
| 4,504,089 | 3/1985 | Calvert | 297/214 |
| 4,756,949 | 7/1988 | Spence | 428/159 |
| 4,761,843 | 8/1988 | Jay | 5/431 |
| 4,999,068 | 3/1991 | Chiarella | 428/320.2 |

FOREIGN PATENT DOCUMENTS

| 2201635 | 8/1973 | Fed. Rep. of Germany | 428/76 |
| 101115 | 6/1984 | Japan | 297/DIG. 1 |
| 155849 | 7/1987 | Japan | 5/450 |

Primary Examiner—George F. Lesmes
Assistant Examiner—Nasser Ahmad
Attorney, Agent, or Firm—Baker & Botts

[57] ABSTRACT

A fused plastisol shock absorbing pad that is encapsulated in an impermeable elastic cover formed from a blown polyester or polyether based urethane film and the method for manufacturing the same that includes the steps of forming the film cover, filling the film cover with the liquid plastisol, heating the pad to fuse the plastisol. In an application of the pad on bicycle seats, a pad assembly is provided that, in addition to the pad, includes a pad retainer constructed from stretch material, this fits over the pad and securely holds the pad on the bicycle seat.

2 Claims, 1 Drawing Sheet

SHOCK ABSORBING PAD

RELATED APPLICATION

This application is a continuation of application Ser. No. 07/673,647 filed Mar. 22, 1991, entitled "Shock Absorbing Pad" by Jary M. Ganske and Leon Ganske, now abandoned.

TECHNICAL FIELD OF THE INVENTION

This invention relates generally to pads for absorbing shock and cushioning. More particularly, but not by way of limitation, this invention relates to shock absorbing pads that include a fused plastisol contained within an encapsulating film cover or package that is resilient and, with regard to the plastisol, impermeable.

BACKGROUND OF THE INVENTION

Plastisols are, in general terms, visco-elastic materials prepared from a major portion of a plasticizer and a minor portion of a resin. Such visco-elastic or plastisols are dispersions of special fine particle size polyvinylchloride resins in plasticizing liquids. In addition to the resins and plasticizers, heat stabilizers and color pigments may be added. In general, plastisol is liquid at room temperature and, upon heating, fusion takes place and the plastisol is converted into a tough, homogeneous mass with excellent abrasion and impact resistance. An example of one such material is discussed in U.S. Pat. No. 4,756,949 issued Jul. 12, 1988 to Spence, et al.

The material described in the '949 patent has been utilized in the formation of pads or cushions for use with bicycle seats. In that application, the plastisol has been fused and is contained within a relatively heavy and cumbersome cover by which it is attached to the bicycle seat. Also, the cover must be maintained carefully because the plastisol is not encapsulated and, thus, is subject to bleeding of plasticizers from the plastisol. In the event that such plasticizers escape from the pad, damage to the clothing worn by the rider of the bicycle may occur.

An object of this invention is to provide a shock absorbing and cushioning pad that is formed from a fused plastisol which is in turn encapsulated within a very flexible, deformable and elastic material which is impermeable to the plasticizers contained within the plastisol.

Another object is to provide a shock absorbing cushioning pad assembly for use on bicycles or the like that includes, in addition to the plastisol pad mentioned above, an elastic cover that is arranged to secure the pad to a bicycle seat or the like.

A further object of the invention is to provide a method for making a fused plastisol pad that is totally encapsulated to prevent the loss of plasticizers therefrom when the pad is in use.

SUMMARY OF THE INVENTION

In one aspect, this invention relates to a shock absorbing, cushioning pad that comprises a pad body constructed from a visco-elastic plastisol material and an impermeable, elastic film cover that overlies the entire outer periphery of the pad body.

In another aspect, this invention relates to an approved method for manufacturing a shock absorbing pad including a pad body of a fusible, liquid plastisol and a cover for receiving the plastisol, the method comprising the steps of forming the cover from a film into the desired pad configuration having at least one fill opening therein, filling the cover with liquid plastisol, sealing the fill opening to fully contain the liquid plastisol within the cover, heating the pad to the fusion temperature of the plastisol and cooling the pad.

In a further aspect, this invention contemplates a pad assembly for use on a bicycle seat, wherein the pad assembly includes a pad constructed from a fused plastisol contained within an elastic, impermeable film generally conforming to the configuration of the bicycle seat and includes a pad retainer that is constructed from elastic material extending over the pad and over a portion of the bicycle seat to retain the pad thereon.

BRIEF DESCRIPTION OF THE DRAWING

The foregoing additional objects and advantages of the invention will become more apparent as the following detailed description is read in conjunction with the accompanying drawing, wherein like reference characters denote like parts in all views and wherein.

DETAILED DESCRIPTION OF THE PREFERRED EMBODIMENT

Figure 1:
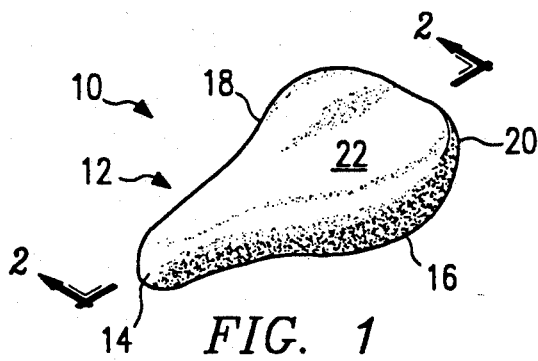
FIG. 1 is a pictorial view of a bicycle seat that includes a pad that is constructed in accordance with the invention.

Referring to the drawing and FIG. 1 in particular, shown therein and generally designated by the reference character 10 is a bicycle seat that includes a pad assembly 12 constructed in accordance with the invention. The seat 10 includes a front 14, sides 16 and 18 and a rear 20.

Figure 2:
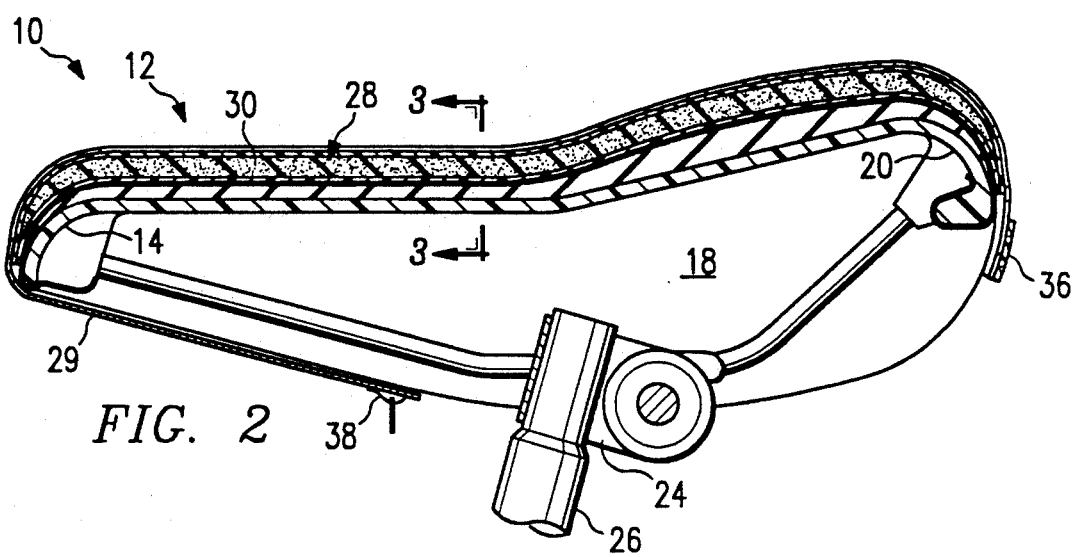
FIG. 2 is an enlarged cross-sectional view taken generally along the line 2—2 of FIG. 1.

As shown in FIG. 2, the bicycle seat 10 also includes an upper surface 22 upon which the pad assembly 12 is disposed. The seat 10 also includes an adjustable bracket 24 for attaching the seat 10 to a seat support member 26 that projects upwardly from a bicycle (not shown).

Figure 8:
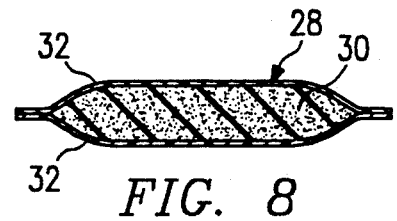
FIG. 8 is a cross-sectional view taken generally along the line 8—8 of FIG. 7.

The pad assembly 12 includes a pad 28 and a pad retainer 29. The pad 28 includes a fused plastisol 30 (see also FIGS. 3 and 8) encapsulated by a cover film 32. The cover 32 is formed from a blown polyester or polyether based urethane film having a thickness of from 50 to 110 microns. One suitable film is Platilon, which is a thermoplastic polyurethane film that can be obtained from Altochem, Inc., Polymers Division, Glen Rock, New Jersey.

The preferred plastisol is "Plasotomeric Plastisol M1430 Clear Base" and the preferred plasticizer is "Plastomeric Type B Plasticizer". Both products are available from Plastomeric, Inc., Waukesha, Wisconsin.

According to Plastomeric, Inc., the M1430 Clear Base material includes 53% PVC copolymer resin, 27% Dioctyl Terephthalate, 2.5% Epoxized Soybean Oil, 3% Calcium-zinc Stabilizers, 7% PVC-based Thixotrope, and 7.5% Adipate Plasticizer-based Tixotrope.

Figure 3:
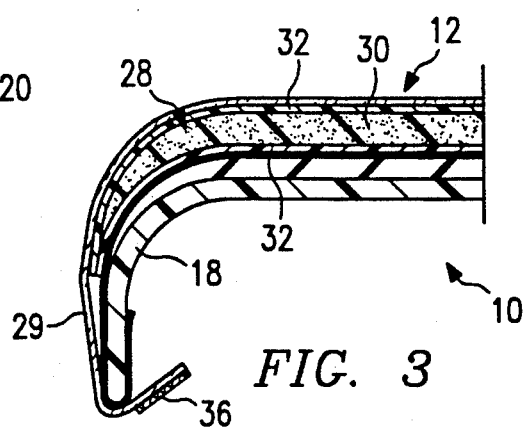
FIG. 3 is an enlarged, partial cross-sectional view taken generally along the line 3—3 of FIG. 2.

The pad 28 is held on the seat 10 by the pad retainer 29. The pad retainer 29 is preferably constructed so that the retainer 29 closely fits the bicycle seat 10 and is preferably constructed from a durable, stretchy material that is relatively smooth to avoid chafing the rider of the bicycle. The outer edges of the retainer 29 are provided with a reinforcing elastic material 36 that is disposed under the edges of the seat 10 when assembled therewith as shown in FIGS. 2 and 3 to securely hold the retainer 29 and the pad 28 on the seat 10.

As an aid to installing the pad assembly 12 on the seat 10, a zipper 38 extends from the front 14 of the retainer 29 toward the seat support 26 as can be seen in FIG. 2. The provision of the independent retainer 29 over the pad 28 to retain the pad 28 on the seat 10 is an advantage over the previously available pads. The pad 28 is virtually indestructible under normal use and will usually outlast the retainer 29. The independent retainer 29 can be replaced as needed without the necessity of buying the entire pad assembly 12.

Previously constructed pads have been rendered virtually inelastic in the horizontal plane, such as when installed on a bicycle seat, due to the heavy inelastic materials that are utilized for encapsulating the plastisol in an effort to prevent leakage of the plasticizers from the plastisol. It will be apparent from the foregoing detailed description that the pad 28, when constructed in accordance with this invention, is encapsulated in the film cover 32 which is elastic in all directions to permit not only shock absorption, but also to permit the pad 28 to conform closely to the configuration of the seat 10.

Figure 4:
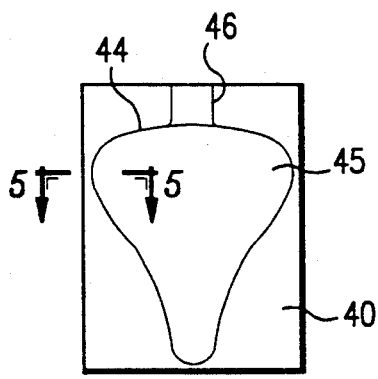
FIG. 4 is a plan view of the film cover for the pad showing the heat welding of the film cover into the desired configuration.
Figure 5:
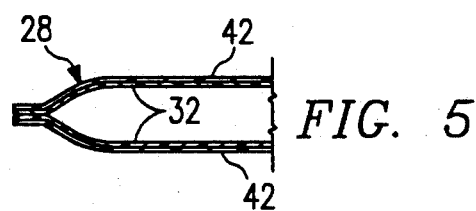
FIG. 5 is an enlarged, partial cross-sectional view taken along the line 5—5 of FIG. 4.

When manufacturing the pad 28, the film 40 for the pad cover is prepared by coextruding the previously described urethane film 32 with a polyethylene carrier film 42 (see FIG. 5). Two layers of such coextruded film 40 are then placed in heat welding apparatus (not shown) to weld the outline 44 of the pad 28 as can be seen in FIG. 4 forming an empty composite cover 45. A fill neck 46 is formed at the top of the cover 45 to provide for an opening for receiving the liquid plastisol.

Figure 6:
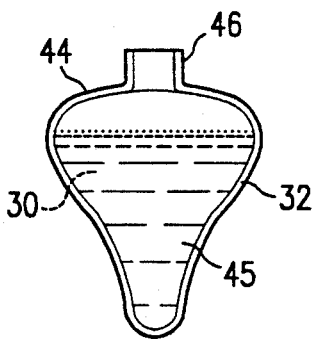
FIG. 6 is a view of the trimmed film cover shown in FIG. 4 with a fill neck formed in one end thereof and with the pad partially filled with plastisol.

After the weld forming is complete, excess material is trimmed from the outside of the weld outline 44, resulting in the empty cover 45 having the configuration of the cover 45 as shown in FIG. 6. The empty cover 45 is grasped by the fill neck 46 and liquid plastisol introduced into cover 45 through the fill neck 46. As the pad is being filled, vibration is applied to eliminate any gas that may be contained in the plastisol.

Figure 7:
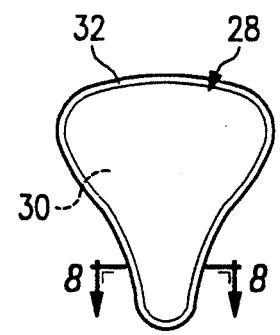
FIG. 7 is a view similar to FIG. 6, but showing the fill neck removed and the top portion of the film cover sealed trimmed to the final configuration.

When the desired level of plastisol has been introduced into the cover 45, manual manipulation is also applied to eliminate any gas that may remain therein. The filled cover 45 is squeezed until a small portion of the plastisol is forced through the fill neck 46. A hemostat or other clamping device is applied across the neck 46 to mechanically seal the plastisol 30 in the cover 45. The filled cover 45 is then removed from the filling and vibrating apparatus and a heat weld is made to close the fill neck 46. The fill neck 46 is removed and the pad 28 is in the configuration illustrated in FIG. 7. At this time, the outer polyethylene carrier layers 42 are removed from the pad 28, leaving only the film cover 32 over the plastisol 30.

The plastisol 30 is in liquid condition at this point in the manufacturing of the pad 28. To jell or solidify the plastisol 30, the temperature of the plastisol 30 must be raised to the fusion temperature of such material. The fusion process also results in the formation of a mechanical bond or adhesion between the solidifying or solidified plastisol and the inside surface of cover 45. The plastisol used will have a fusion temperature of between 275° F. and 400° F. and preferably, a fusion temperature of about 330° F.

To avoid damage to the pad 28 while heating the plastisol 30, it is preferred that a convection oven be used. To further avoid damage to the pad 28 during heating, the pad 28 is placed on a greased oven sheet which prevents sticking of the film cover 45 to the oven sheet and also permits the film cover 32 and the plastisol 30 to move in response to changes in dimensions with the temperature changes that occur in the oven. The grease or lubrication preferred is a petrolatum or petroleum jelly. The preferred lubricant is "Fonoline" from the Sonneborne Division of Whitco, Inc.

After greasing an area of the oven sheet sufficiently large to contain the pad 28, the pad is placed thereon and inserted into the convection oven. The use of the convection oven is preferred because of the ability to closely control the temperature. Upon reaching the fusion temperature of the plastisol, the pad 28 is removed from the oven, allowed to cool and then cleaned to remove the remaining traces of the lubricant therefrom.

After completing the pad, and to place it in use on the bicycle seat 10, the pad 28 is placed on the surface 22 of the seat, the retainer 29 is placed thereover with the front thereof inserted over the front 14 of the seat 10. Elastic 36 in the retainer 29 is stretched so that the retainer 29 encompasses the pad 28 and extends over the edges of the seat 10. The zipper 38 is closed, completing the securing of the retainer 29 on the seat 10 so that the pad 28 and the retainer 29 closely conform to the configuration of the seat 10.

While the invention has been described in connection with a pad for a bicycle seat, it will be understood that there are many other applications for a pad constructed in accordance with the invention.

A pad constructed in accordance with the foregoing detailed description will provide a soft, shock absorbing pad that is completely encapsulated in an impermeable cover which is elastic and yet prevents the loss of plasticizers therefrom and provides a pad assembly having an independent retainer which can be replaced without replacing the entire pad assembly.

The foregoing detailed description is for a single embodiment of the pad and describes but one method of manufacturing the pad. It should be realized that such detailed description is provided by way of example only and that there are changes and modifications that can be made thereto without departing from the spirit of the invention.

What is claimed is:

1. A pad assembly for use on a bicycle seat having a front, back and sides, the pad assembly including:
    a pad constructed from a fused plastisol contained within an elastic, plastisol-impermeable film generally conforming to the configuration of the bicycle seat; and
    a pad retainer constructed from an elastic material extending over said pad and over a portion of said bicycle seat to retain said pad thereon, said pad retainer includes a zipper fastener extending from the front toward the back of said seat to secure said pad retainer onto said seat.

2. The pad assembly of claim 1 wherein said pad retainer includes an elastic strip extending from the end of said zippper and disposed along the sides and back of said seat to assist in securing said pad retainer on said seat.

* * * * *